Figure 1:
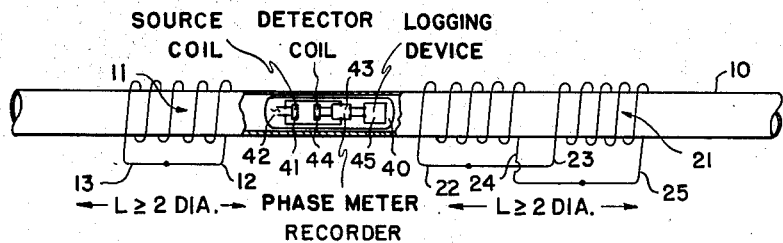

Dec. 31, 1963        T. R. SCHMIDT        3,116,452
EDDY CURRENT TYPE PIPELINE FLAW TESTING
AND FLAW LOCATION MARKING DEVICE
Filed June 6, 1960

INVENTOR:
T. R. SCHMIDT

BY: *Theodore E. Bieber*

HIS ATTORNEY

United States Patent Office 3,116,452
Patented Dec. 31, 1963

3,116,452
EDDY CURRENT TYPE PIPELINE FLAW TESTING AND FLAW LOCATION MARKING DEVICE
Thomas R. Schmidt, Lafayette, Calif., assignor to Shell Oil Company, New York, N.Y., a corporation of Delaware
Filed June 6, 1960, Ser. No. 34,290
3 Claims. (Cl. 324—40)

This invention pertains to pipeline marking devices and more particularly to a device for placing a distinctive mark on the record obtained when a pipeline is surveyed by an instrument.

Pipelines are utilized by the petroleum industry to economically transport both crude oil and finished products over long distances. Due to either the environment in which the pipelines are installed or the products being transported within the pipelines, corrosion occurs and must be detected prior to failure of the pipeline to prevent interruptions in scheduled operations of the pipeline. In the past, various methods have been proposed for detecting corrosion in pipelines, one of these methods being the use of eddy current type instruments pumped through the line. Regardless of the way in which the corrosion is detected, the problem of correlating the record obtained with the actual position of the instrument along the pipeline has always existed. The conventional way of solving this problem in the past has been to estimate the position of the instrument by calculating its position from the pumping rate in the pipeline and the elapsed time. For example, if a defect in the pipeline was indicated on the record 15 feet from the beginning of the record and knowing that the record moves at the rate of ten feet per hour, it is obvious that the defect occurred one and one-half hours after the start of the survey. Thus, if the product in the pipeline was moving at the rate of four miles per hour and assuming that no slippage occurred during the survey, the defect occurred six miles from the start of the survey. While this is a rapid method of obtaining an estimate of the location of the defect, it is not useful in pin-pointing the exact location because of the limited accuracy and the assumptions made.

Another method that has been used in the past for locating the position of the instrument has been to detect the position of various road crossings as well as the welded joints between individual sections of the pipeline. This method is particularly useful where eddy current type of detecting equipment is used. Unfortunately, this method also fails for the same reason as pointed out above, mainly it will not pin-point the exact location of a defect or corroded area in the pipeline. Of course, there is a possibility that the defect requiring attention may be located very close to one of these natural occurring markers such as a road crossing, valve or similar section of the pipeline. In these few cases the method is useful but in the majority of cases it fails to provide useful information. The only sure method of locating suspected areas of a pipeline presently used is to uncover the pipeline and visually inspect it. This is obviously a costly and time-consuming operation.

Accordingly, the principal object of this invention is to create novel artificial markers along a pipeline which permit one to accurately locate a defect occurring in the pipeline.

A further object of this invention is to provide novel artificial marking means which may be adjusted to give either a positive or negative signal when eddy current type surveying instruments are utilized for surveying the pipeline.

The above objects and advantages of this invention are achieved by placing a few turns of conducting wire around the exterior of a pipeline at selected locations. The ends of the turns are shorted if one desires a positive signal while a negative signal is achieved by splitting the turns into two separate coils and connecting their ends in electrical opposition. When an eddy current type of detecting device passes by the coils a large positive or negative signal will be indicated on the record of the device, thus determining the exact location of the survey device. Of course, it is necessary that the pipeline be uncovered in order to install the marking device of this invention but this is of small importance when one considers that only a small section of the pipeline need be uncovered. Furthermore, two methods may be used in practicing this invention, one being to survey the pipeline and determine roughly the approximate location of the defect. The suspected area is then re-surveyed utilizing the markers of this invention to determine the exact location of the defect. The other method is to install a large number of markers constructed according to this invention at predetermined locations along the pipeline and at sufficiently close spacings so that any defect may be accurately located from one survey of the pipeline. The method which is used usually depends on the accessibility of the pipeline and the depth at which it is buried, but in either case it is not necessary to maintain the movement of the survey tool proportional to the flow in the pipeline.

While the invention is described below with respect to an eddy current type of survey tool it can be used with any type of survey tool. For example, when used with temperature or pressure survey tools an eddy current instrument could be incorporated in the survey tool to provide the required markers. Thus, it provides a record marking means for any type of survey tool. Also, the markers of this invention can be used in a coded sequence of positive and negative markers to accurately locate the position of a defect without relying on other means.

Figure 2:
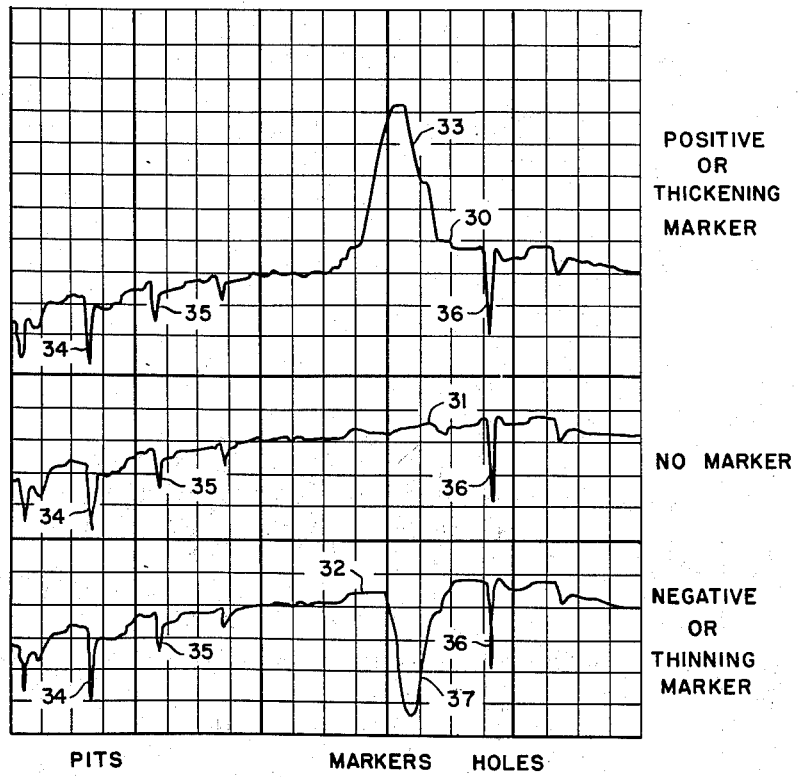

The above and other objects and advantages of this invention will be more easily understood from the following detailed description of a preferred embodiment of this invention when taken with the attached drawings, in which:

FIGURE 1 illustrates a section of pipeline having both a positive and negative marker installed thereon; and, FIGURE 2 illustrates the types of records obtained when a pipeline is surveyed using the markers of this invention.

Referring now to FIGURE 1 there is shown a section of pipeline 10 which is preferably formed of a ferromagnetic type of material such as iron or steel. The pipeline is surveyed by an eddy current type of instrument in order to locate defects occurring therein. An eddy current type of instrument which is utilized for surveying well casings have similar characteristics to those of a pipeline is disclosed in copending application of T. R. Schmidt entitled "Pipe Inspection Device," Serial No. 778,801, filed Dcember 8, 1958, now Patent No. 3,060,377. The device illustrated in this copending application cannot be used to inspect pipelines but it does illustrate the principle of operation of an eddy current type of detecting instrument. Of course, as explained above, the invention may be used with any type of survey instrument providing an eddy current type of detector is incorporated.

Positioned around the left-hand portion of the pipeline is a coil of wire 11 having its two ends 12 and 13 coupled together to short the coil. The coil 11 is formed from any suitable electrical conducting material, for example, copper wire, and consists of from three to ten turns, although the maximum number of turns is not critical. The length of the coil should be at least two pipe diameters or greater, although the exact length is not critical. The limiting factor as to both the number of turns and length of the coils is the cost of the material for fabricating the coil and not the design.

Positioned around the right-hand end of the pipeline 10 are two coils 20 and 21. The coils 20 and 21 are connected in electrical opposition by connecting the end 22 of the coil 20 to the end 23 of the coil 21. Similarly, the end 24 of the coil 20 is coupled to the end 25 of the coil 21. By connecting the coils in electrical opposition one will obtain a negative signal in contrast to a single coil which provides a positive signal as will be more fully explained below. Each of the coils 20 and 21 is formed from an electrical conducting material and consist of three or more turns. The overall length of the two coils together should be equal to or greater than two times the diameter of the pipeline 10.

Also shown in FIGURE 1 is a schematic arrangement of this invention combined with a separate logging device. The complete system is enclosed within a housing 41 and forms a probe which is passed through the pipeline. A source coil 41 is coupled to an alternating current supply 42 which may be an oscillator or the like. The source 42 is also coupled to a phase meter recorder 43. A detector coil 44 is coupled to the phase meter recorder 43 and supplies the detected signal whose phase is compared with the source. Any out of phase signal is recorded by the recorder. The recorder also records the signal from a logging device 45 in an aligned relationship to the signal from the phase meter. As explained above the logging device may be a pressure or temperature surveying instrument. The logging device could also be a corrosion testing tool operating on the eddy current principle. In cases where the logging device is an eddy current type of instrument the logging device will respond to the markers and a separate eddy current device will not be required. While phase discrimination detection is described above for the eddy current device, amplitude or other types of detection could also be used.

Referring now to FIGURE 2, there is shown three traces 30, 31, and 32 obtained when an eddy current type of surveying instrument was passed through a section of pipe containing markers constructed in accordance wtih this invention. If a different type of survey instrument is used the traces from the survey instrument will appear in an aligned relationship to the traces from the eddy current instrument. The trace 30 has a large positive signal 33 shown thereon which indicates the location of the marking device formed by a single coil such as coil 11 of FIGURE 1. The various small negative signals 34 and 35 illustrate pits occurring in the pipeline while the signal 36 illustrates a hole appearing in the pipeline. The trace 31 has no signal indicating the location of a marker and illustrates the record obtained when all markers were removed from the section of pipe line. The negative signals 34 and 35 denoting the pits in the pipeline are still present in the same position as in the trace 30 as is the signal 36 indicating a hole in the pipeline. The trace 32 is a record obtained when the same section of the pipeline was surveyed with a negative type of marking device such as coils 20 and 21 of FIGURE 1 installed in the same location as the marking device in trace 30. Again the negative signals 34 and 35 denoting pits are present as is the signal 36 denoting a hole in addition to the large negative signal 37 showing the location of the marking device.

From the above discussion it can be seen that a unique pipeline marking device has been provided which may be installed at any desired position on the pipeline. Furthermore, the marking device can be arranged so that it provides either a positive or negative signal on the trace of the survey of the pipeline. By combining the positive and negative markers, a coded sequence of markers can be obtained. Thus, very long pipelines can be surveyed and defects located accurately without relying on the maintaining of a proportional relationship between the travel of the survey tool and the flow in the pipeline.

While but one embodiment of this invention has been described in detail it should not be limited to the particular details described but only to its broad spirit and scope.

I claim as my invention:

1. A record marking device for pipeline surveying tools including a tool operating on the eddy current principle comprising: a pair of closely spaced coils, each coil being formed from a few turns of conducting wire and disposed to surround the pipeline, said coils being coupled in electrical opposition to each other whereby an error signal of large magnitude will be induced in the survey tool as it passes said coil.

2. A record marking device for pipeline surveying tools including a tool operating on the eddy current principle comprising: two coils each having four to six turns and disposed in an inductive relationship to said pipeline, each of said coils in addition having a length of at least the diameter of pipeline, said coils being coupled to each other in electrical opposition.

3. A system for continuously locating a self-contained instrument adapted to travel through a pipeline to measure a physical condition related to the pipeline, said system comprising:

a self-contained instrument disposed to travel through the pipeline, said instrument having a source coil coupled to an alternating current supply;

a detecting coil spaced from said source coil and disposed in the instrument to measure the changes in the electro-magnetic field caused by the physical condition of the pipeline as said instrument passes through the pipeline;

recording means in said strument, said recording means being coupled to said detecting coil to record the measured electro-magnetic field with relation to the travel of the instrument through the pipeline; a marker coil formed from a few turns of conducting wire and disposed in an inductive relationship to the pipeline, said coil having its ends shorted;

said detecting coil in addition detecting the presence of said marker on said pipeline simultaneously with the passage of the instrument past said marker;

and said recording means in addition recording the location of the detected marker on the record of the measured electro-magnetic field.

References Cited in the file of this patent

UNITED STATES PATENTS

| | | |
|---|---|---|
| 2,228,623 | Ennis | Jan. 14, 1941 |
| 2,438,197 | Wheeler | Mar. 23, 1948 |
| 2,828,480 | Golladay | Mar. 25, 1958 |
| 2,934,695 | Maulsby | Apr. 26, 1960 |